(12) United States Patent
Kim et al.

(10) Patent No.: US 9,434,620 B2
(45) Date of Patent: Sep. 6, 2016

(54) METHOD FOR PRODUCING FOAM-SHAPED GRAPHENE STRUCTURE BY BOILING, AND FOAM-SHAPED GRAPHENE STRUCTURE USING SAME

(71) Applicant: POSTECH ACADEMY-INDUSTRY FOUNDATION, Pohang-si, Gyeongsangbuk-do (KR)

(72) Inventors: Moo Hwan Kim, Pohang-si (KR); Ho Seon Ahn, Pohang-si (KR); Ji Wook Jang, Ulsan (KR); Jae Sung Lee, Pohang-si (KR)

(73) Assignee: POSTECH ACADEMY-INDUSTRY FOUNDATION, Pohang-si, Gyeongsang (KR)

( * ) Notice: Subject to any disclaimer, the term of this patent is extended or adjusted under 35 U.S.C. 154(b) by 3 days.

(21) Appl. No.: 14/425,603

(22) PCT Filed: May 10, 2013

(86) PCT No.: PCT/KR2013/004154
§ 371 (c)(1),
(2) Date: Mar. 3, 2015

(87) PCT Pub. No.: WO2014/035030
PCT Pub. Date: Mar. 6, 2014

(65) Prior Publication Data
US 2015/0251912 A1 Sep. 10, 2015

(30) Foreign Application Priority Data
Sep. 3, 2012 (KR) .................. 10-2012-0097000

(51) Int. Cl.
*C01B 31/00* (2006.01)
*C01B 31/04* (2006.01)
(Continued)

(52) U.S. Cl.
CPC ............ *C01B 31/0446* (2013.01); *B82Y 30/00* (2013.01); *B82Y 40/00* (2013.01); *C01B 31/00* (2013.01); *C01B 31/0438* (2013.01); *C01B 2204/22* (2013.01); *Y10T 428/249967* (2015.04)

(58) Field of Classification Search
CPC .......... C01B 31/0446; C01B 31/0423; C01B 31/043; C01B 31/0438; C01B 31/00
USPC .................................... 427/244, 245, 122
See application file for complete search history.

(56) References Cited

U.S. PATENT DOCUMENTS

2013/0314844 A1* 11/2013 Chen .................... C01B 31/043
361/502

FOREIGN PATENT DOCUMENTS

KR 10-2010-0016929 A 2/2010
KR 10-2012-0095042 A 8/2012
(Continued)

OTHER PUBLICATIONS

Wen et al , Colloids and surfaces, A: Physicochemical and Engineering Aspects 132(1998) 315-319.*
Chen, Z. et al., "Three-dimensional flexible and conductive interconnected graphene networks grown by chemical vapour deposition", Nature Materials, Jun. 2011, vol. 10, Issue 6, pp. 424-428.
(Continued)

*Primary Examiner* — Michael Cleveland
*Assistant Examiner* — Tabassom Tadayyon Eslami
(74) *Attorney, Agent, or Firm* — Knobbe Martens Olson & Bear LLP

(57) ABSTRACT

The present invention relates to a foam-shaped graphene structure and, more particularly, to a method for producing a foam-shaped graphene structure by boiling, and to a foam-shaped graphene structure using same. Provided is a method for producing a foam-shaped graphene structure by boiling, which includes the steps of: preparing a base substrate (S1); placing the base substrate in a reduced graphene oxide (RGO) colloid solution (S2); applying a heat flux to the base substrate using an exothermic body so as to cause boiling (S3); and generating the foam-shaped graphene structure on the base substrate as bubbles generated by the boiling become overlapped (S4).

7 Claims, 11 Drawing Sheets

(51) Int. Cl.
B82Y 30/00 (2011.01)
B82Y 40/00 (2011.01)

(56) References Cited

FOREIGN PATENT DOCUMENTS

WO 2009-029984 A1 3/2009
WO 2012-057702 A1 5/2012

OTHER PUBLICATIONS

Xiaochen Dong et al., "3D Graphene Foam as a Monolithic and Macroporous Carbon Electrode for Electrochemical Sensing" ACS Appl. Mater. Interfaces, 2012, vol. 4, pp. 3129-3133.
International Search Report dated Aug. 2, 2013 of PCT/KR2013/004154 which is the parent application and its English translation—4 pages.

* cited by examiner (b)

|  | GO (%) | RGO (%) | SFG (%) |
|---|---|---|---|
| C-C | 50.9 | 61.9 | 64.9 |
| C-O | 32.1 | 19.8 | 16.9 |
| C=O | 10.1 | 8.9 | 9.2 |
| C(O)O | 3.5 | 5.4 | 3.9 |
| $\frac{(C-C)+(C=C)}{(C-O)+(C=O)+C(O)O}$ | 1.1 | 1.8 | 2.1 |

METHOD FOR PRODUCING FOAM-SHAPED GRAPHENE STRUCTURE BY BOILING, AND FOAM-SHAPED GRAPHENE STRUCTURE USING SAME

TECHNICAL FIELD

The present invention relates to a foam-shaped graphene structure, and more particularly, to a method for producing a foam-shaped graphene structure by boiling, and a foam-shaped graphene structure prepared using the same.

BACKGROUND ART

Since A. Geim and K. Novoselov have simply and successfully isolated a graphene monolayer, which is composed of flat plates having a thickness corresponding to one $sp^2$-bound carbon atom, from graphite using a so-called Scotch tape method in 2004, a variety of research groups have conducted ardent research on graphene in an attempt to understand and employ abnormal characteristics such as superior electronic characteristics (semimetals, zero-gap semiconductors, a high electron mobility of 15,000 $cm^2V^{-1}s^{-1}$, and a resistance of $10^{-6}\Omega$ lower than silver), thermal conductivity (5,000 $Wm^{-1}K^{-1}$), optical characteristics (transparency and absorbing only 2.3% of white light), a high mechanical strength (200 times higher than steel), and a high surface area per unit mass (solution characteristics, and a face area of 3,000 $m^2g^{-1}$).

Owing to such unique characteristics, graphene has been, for example, known to be highly useful in being used in transparent conductive films, electrodes for energy storage devices, filed-effect devices, microelectronic devices, chemical and biological sensors, and filler-conductive polymer composites.

Most of conventional research has focused on two-dimensional (2D) structures. However, the shape of graphene having a three-dimensional (3-D) structure has been more recommended to make use of most of the excellent physical and electronic characteristics, a high surface, and chemical functions.

In recent years, Chen el al processed a 3-D graphene foam using a template-directed chemical vapor deposition (CVD). The optimized conductivity of the 3-D graphene foam is 10 $S \cdot cm^{-1}$, which is an order of calculation of approximately 6 higher than that of a chemically derived graphene-base composite.

Also, the conductivity of graphene is maintained even after pores are filled with polydimethylsilonxane (PDMS). However, CVD treatment requires a high processing temperature and an etching process, which makes it necessary to make a graphene foam on a nickel or copper foam. And, an additional process of transferring a graphene film onto another substrate is essentially required. However, such a process has a problem in that it is expensive and a large amount of time is required.

Further, conventional CVD methods have a problem in that a metal should be etched again with an acid after a nickel foam is processed, and exposed to a high temperature of 1,000° C. to perform chemical vapor deposition.

DISCLOSURE

Technical Problem

The present invention is designed to solve the problems of the prior art, and therefore it is an object of the present invention to provide a method of directly forming a self-assembled foam-like graphene (SFG) structure on various types of substrates to be treated by simple nuclear boiling, and a SFG structure formed by the method.

Technical Solution

According to an aspect of the present invention, there is provided a method for producing a foam-shaped graphene structure by boiling, which includes the steps of: preparing a base substrate (S1), placing the base substrate in a reduced graphene oxide (RGO) colloid solution (S2), applying a heat flux to the base substrate using an exothermic body so as to cause boiling (S3), and generating a foam-shaped graphene structure on the base substrate as bubbles generated by the boiling overlap (S4).

In this case, in Step S1, the base substrate may be at least one selected from the group consisting of silicone, a transparent conductive oxide (TCO) glass, a metal, a mother glass, and an elastic polymer.

Also, in Step S2, the graphene oxide may be reduced by hydrazine.

In addition, the reduced graphene oxide may be present at a content of 0.01 to 0.0001% wt in the colloid solution in Step S2.

Further, the reduced graphene oxide may be present at a content of 0.005% wt in the colloid solution in Step S2.

Also, the base substrate itself may serve as a heater instead of the exothermic body in Step S3.

Further, in Step S3, the heat flux may be adjusted within a range of 100 $kW/m^2$ to 1,500 $kW/m^2$.

According to another aspect of the present invention, there is provided a foam-shaped graphene structure produced by the method for producing a foam-shaped graphene structure by boiling.

Advantageous Effects

According to the method for producing a foam-shaped graphene structure by boiling according to one embodiment of the present invention, a graphene structure can be simply formed using a conventional reduced graphene oxide (RGO) colloid.

Also, the method for producing a foam-shaped graphene structure by boiling according to one embodiment of the present invention provides cost saving and convenience in process since the conventional CVD methods do not require a process of etching a metal with an acid after a nickel foam is processed.

In addition, the method for producing a foam-shaped graphene structure by boiling according to one embodiment of the present invention can be useful in adjusting the thickness of a graphene structure produced under control of the heat flux, and forming a translucent graphene structure.

Additionally, since pores present in foam are much smaller than that of the conventional methods, a large amount of water can be absorbed into the foam. As a result, a dye can easily penetrate through the foam, and thus the foam-shaped graphene structure can be used for solar cells.

Further, the foam-shaped graphene structure has an advantage in that it has higher electrical conductivity than the foam prepared using the CVD methods, and that an SFG structure can be formed on substrates having various sizes.

DESCRIPTION OF DRAWINGS

FIG. 1A shows a mechanism of forming a base graphene layer (BGL) structure, and FIG. 1B shows a mechanism of forming an SFG seed.

FIG. 8A shows a boiling curve to which the heat flux and a wall temperature are applied, and FIG. 8B to 8E show formation of bubbles and SFG structures according to a change in heat flux.

FIG. 9A to 9D show pictures and SEM images of SFG films formed on a FTO glass (A), copper foil (B), a glass (C), and PDMS (D).

FIG. 11A is a schematic diagram of SFG-based QDSSCs, FIG. 11B is a real image of the SFG-based QDSSCs, and FIG. 11C shows the performance of Au, 2-D-RGO and SFG-based QDSSCs.

EMBODIMENT

Hereinafter, preferred embodiments of a method for producing a foam-shaped graphene structure by boiling according to the present invention, and a foam-shaped graphene structure prepared using the same will be described in detail with reference to the accompanying drawings. However, it is contemplated that like numbers refer to like elements throughout the description of the figures even when the elements are shown in the different drawings. Also, in describing the present invention, detailed descriptions with respect to known functions or constructions of the present invention will be omitted for clarity when the detailed descriptions make the scope of the present invention ambiguous.

The method for producing a foam-shaped graphene structure by boiling according to one embodiment of the present invention is as described below. First, a base substrate is prepared. The base substrate may be at least one selected from the group consisting of silicone, a transparent conductive oxide (TCO) glass, a metal, a mother glass, and an elastic polymer.

Next, the base substrate is placed in a reduced graphene oxide (RGO) colloid solution.

A heat flux is applied to the base substrate using an exothermic body so as to cause boiling. Here, the base substrate itself may serve as a heater instead of the exothermic body.

Bubbles are generated by the boiling, and a foam-shaped graphene structure is produced on the base substrate as the generated bubbles overlap.

Figure 1:
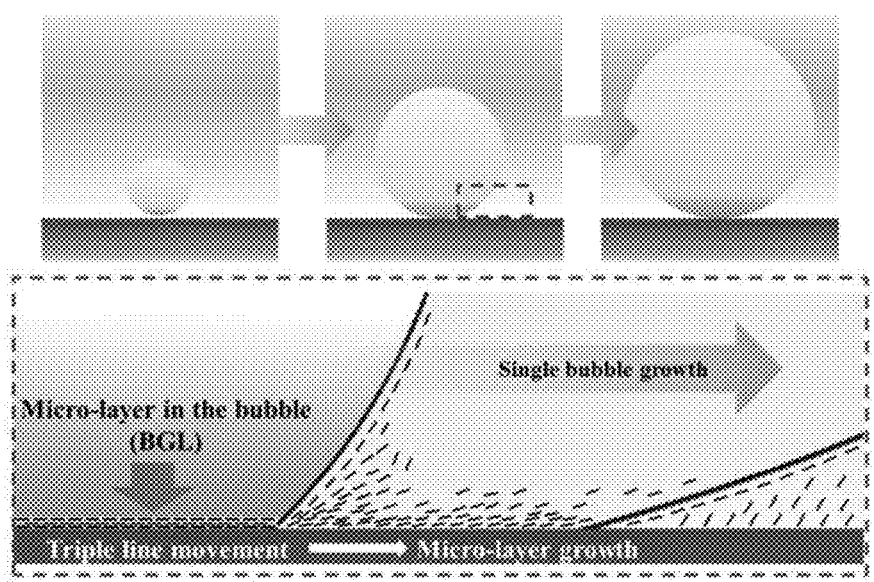
FIG. 1 is a diagram showing a mechanism of forming a foam-shaped graphene structure according to one embodiment of the present invention.
Figure 1:
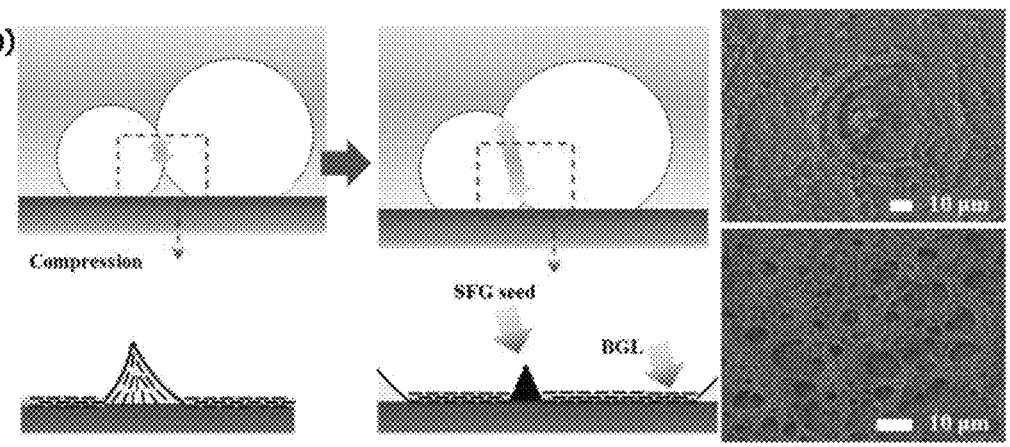

FIG. 1 is a diagram showing a mechanism of forming a base graphene layer (BGL) structure, and a mechanism of forming a self-assembled foam-like graphene (SFG) seed.

It shows that a triple line (a line on which gas, liquid and solid phases converge) is moving along a micro-layer in bubbles while forming a base graphene layer (BGL) as the bubbles grow (FIG. 1A). The plurality of isolated bubbles are suddenly combined as the bubbles grow and break away. Since the concentration of RGO platelets suddenly increase at local vacancies between the bubbles, the RGO platelets are compressed during a process of forming a seed for SFG structures. The bubbles are generated on a base graphene layer, and an SFG seed is formed in a space in which the bubbles overlap. The SFG seed grows as the bubbles continue to overlap as described above (FIG. 1B).

The formation of the foam-shaped graphene structure by boiling is performed using a simple nuclear boiling method. A thin substrate may be put on a heater. In this case, the substrate itself may serve as a heater in a graphene colloid solution. A reduced graphene oxide (RGO) is sufficiently dispersed in the graphene colloid solution by hydrazine due to electrostatic repulsion between carboxyl groups charged into cathodes on a graphene seed. At least 90% of RGO is observed in the form of a monolayer, and the size of the RGO seed suspended in water is measured using an atomic force microscope (AFM). As a result, the size of the RGO seed is in a range of 0.5 to 1 μm. The RGO colloid solution saturated in an atmospheric environment is boiled by a silicone heater coated with silicon dioxide ($SiO_2$) for 10 minutes at a heat flux of 1,200 $kW/m^2$.

The heat flux and wall temperature of the heater are controlled by adjusting an applied electrical voltage.

First, a base graphene layer (BGL) having a thickness of 50 to 100 nm grows on a surface of silicon dioxide in the RGO solution during nuclear boiling (FIG. 2A) The base graphene layer is an assembly 2-D RGO platelet including 5 to 10 RGO layers, and evenly stacked on a substrate. This will comply with a mechanism for forming a base graphene layer. The RGO platelet maintains hydrophilicity due to the presence of carboxyl groups appearing at edges of the RGO plate. The X-ray photoelectron spectroscopic spectra (XPS) of graphene oxide (GO) and RGO at 284.6, 286.5, 287.8 and 289.1 eV are derived from $C_{1s}$ peaks of C—C, C—O, C=O, and C(O)O. Among theses, the C—O peak at 286.5 eV is significantly lowered due to epoxides and hydroxyl groups. However, the C=O peak at 287.8 eV is not lowered to the same level as the C—O peak due to the carboxyl groups (FIG. 3).

As indicated by a red circle in a highly magnified scanning electron microscopic (HRSEM) image of FIG. 2A, a contact angle of a with respect to the interface between BGL and a silicon dioxide substrate is measured. From the fact that the contact angle (56.3°) of the droplet having a volume of 1 μL on BGL is lower than the contact angle (72.2°) of the droplet having a volume of 1 μL on the silicon dioxide substrate, it is revealed that BGL has very high surface wettability. The carboxyl groups charged into the cathodes makes BGL to exhibit very excellent wettability. The SFG structure starts to be formed on BGL by the aid of the bubbles on the substrate due to condensation between hydrogen bonds and RGO plates. Most of the RGO plates are present in the form of a free-standing foam used to manufacture a wall of SFG pores.

The contact angle of the droplet at this early stage is shown to be 62.4°, indicating that the film still has hydrophilicity due to BGL present below the SFG seed (FIG. 2B)

However, as the reaction further proceeds, the SFG structure is formed, and the contact angle of the droplet on a surface of the 3-D SFG structure is 120.6°, which indicates that the surface of the SFG structure is superhydrophobic (FIG. 2C). An interesting phenomenon is observed while measuring the contact angle of the droplet. In the prior art, it has been accepted that water does not penetrate through pores or a hydrophobic substance having a micro-/nano-scaled structure.

Figure 4:
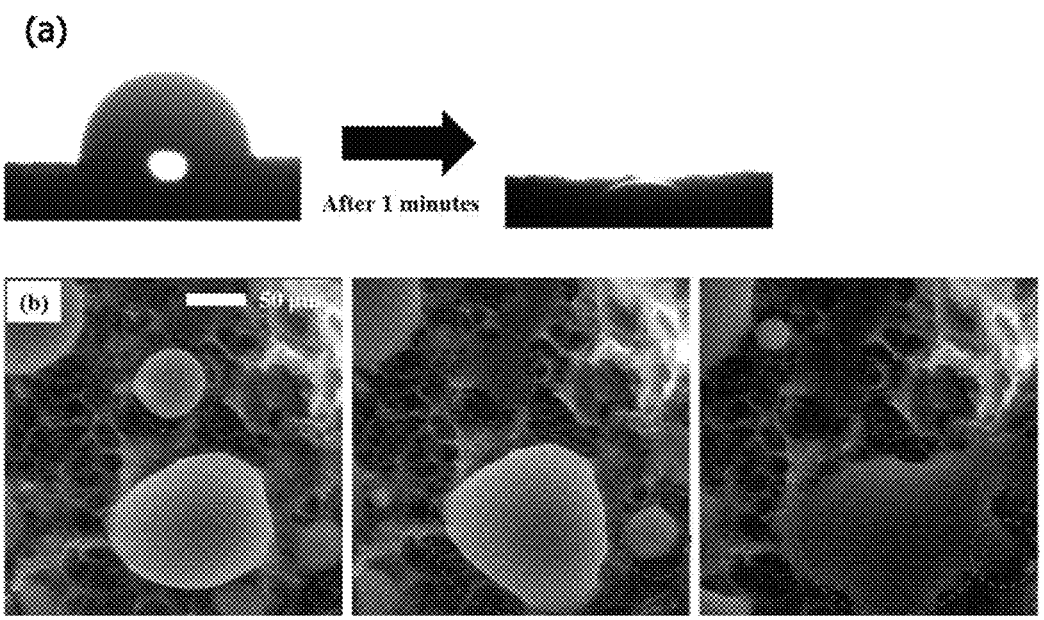
FIG. 4 shows the results of a surface wettability test performed on SFG using environmental-scanning electron microscopy (E-SEM).

However, when droplets having a volume of 10 μL is dispersed, the droplets are absorbed within one minute, as shown in FIG. 4A. To further study the water absorption, the wettability on the SFG layer is observed using environmental-scanning electron microscopy (E-SEM). The results are shown in FIG. 4B.

Water on the SFG layer at 30° C. and 0.6 bar is observed using a digital camera. Several droplets are generated on the SFG layer. Most of the droplets on the SFG film disappear as indicated by a red dotted circle in the E-SEM image. From such results, it can be seen that the SFG layer has both hydrophilicity and hydrophobicity.

This is because the RGO plate having hydrophobicity is exposed by means of self-assembly, and the carboxyl groups are buried in the structure. Such two characteristics make the RGO plate applicable as a scaffold in polar and organic solvents. Since the entire surface of the graphene foam grown by the CVD method is hydrophobic, it is difficult to apply the RGO plate as the scaffold in the polar solvent. It is possible to apply the SFG layer as the effective scaffold for a detailed mechanism for forming a QDSSC counter electrode and a SFG structure.

Figure 2:
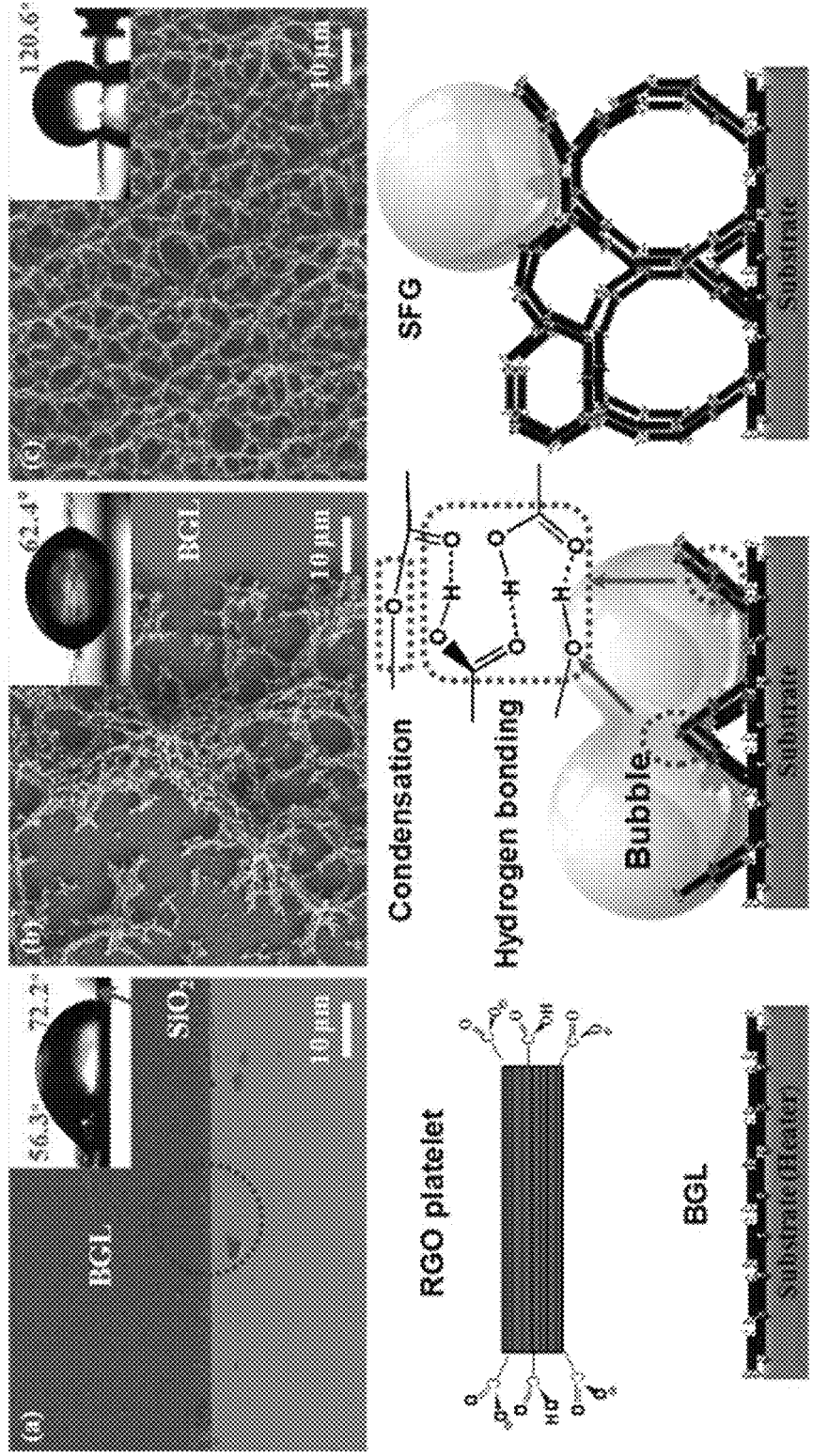
FIG. 2A shows that BGL:RGO platelets are evenly stacked at a thickness of 50 to 100 nm.
FIGS. 2B and 2C show a process of forming a SFG structure from a seed and bubbles.
Figure 3:
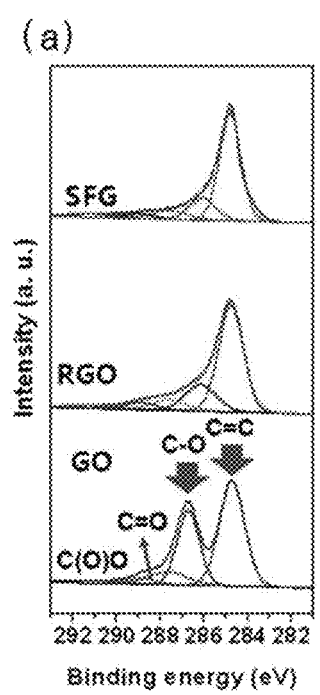
FIG. 3 shows the deconvolution of XPS peaks of GO, RGO and SFG.
Figure 5:
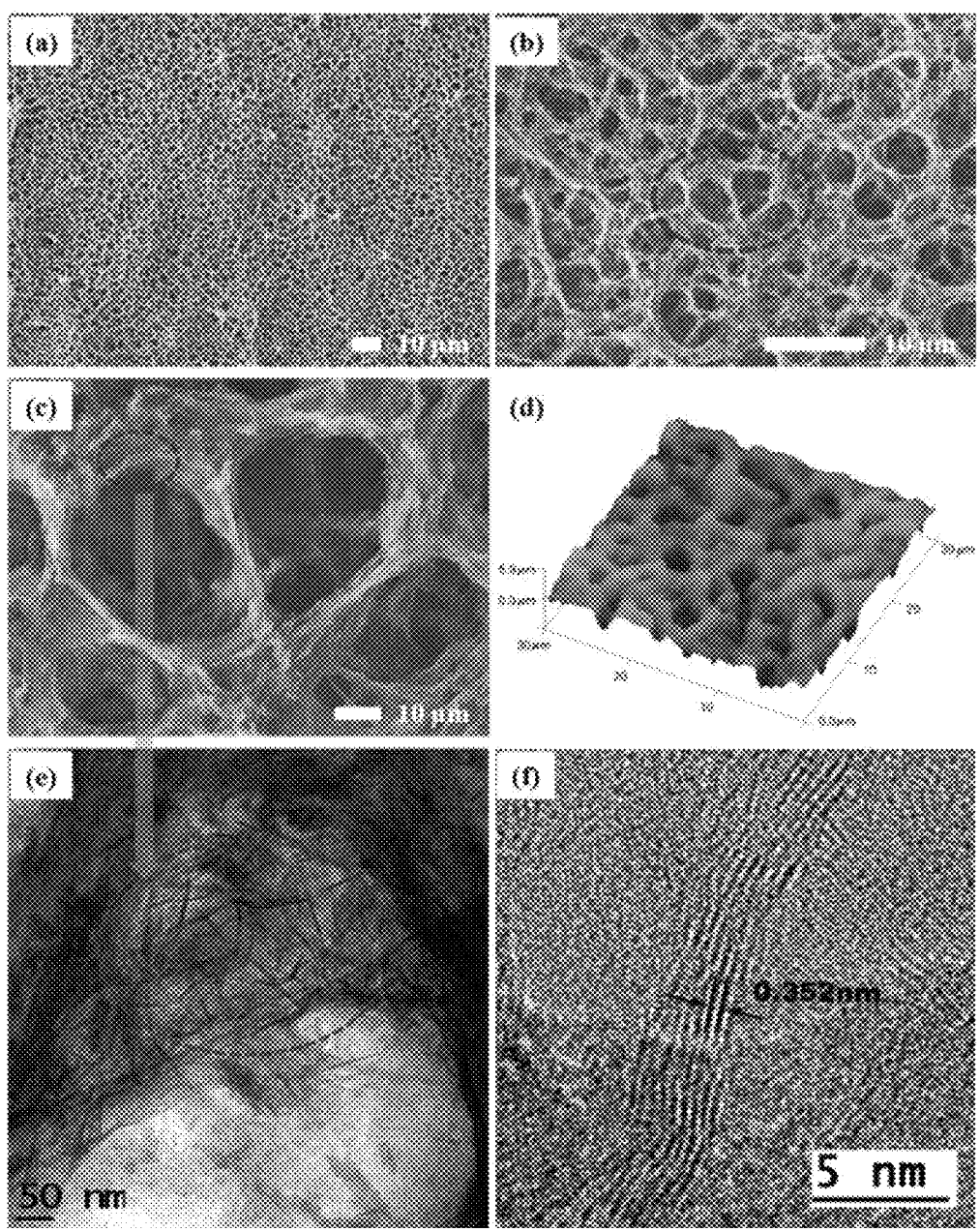
FIG. 5 shows the morphologies of 3D SFG structures.
Figure 6:
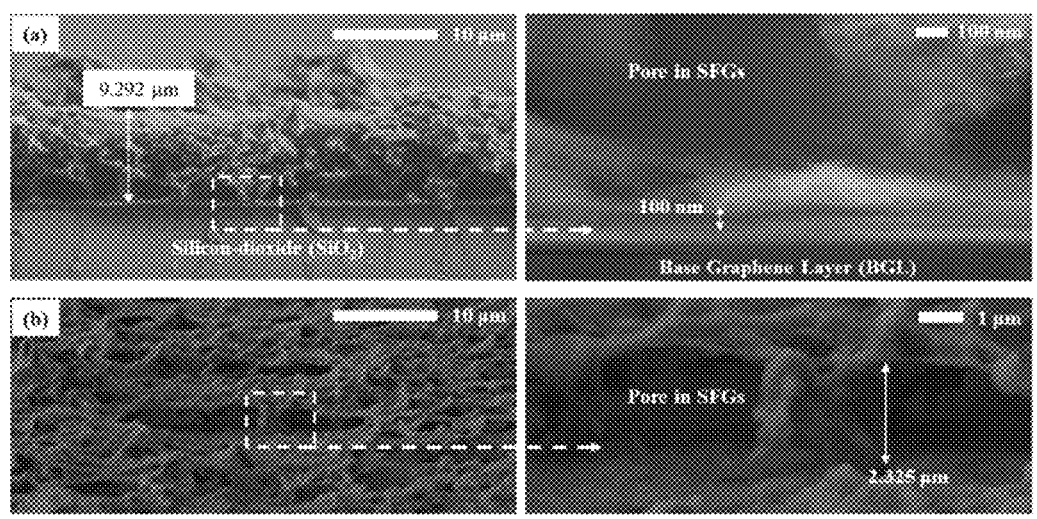
FIG. 6 is a side view showing the 3D SFG structure as a highly magnified scanning electron microscopic (HRSEM) image.

The morphology of the SFG structure is further studied by means of HRSEM analysis and high-resolution transmission electron microscopic (HRTEM) analysis (FIGS. 2, 5 and 6). FIG. 5A to 5C are enlarged views of SEM images of an SFG structure, and FIG. 5D is a diagram showing an AFM image of the SFG structure.

The size of the pores is generally in a range of 1 to 5 μm. The RGO platelets are tightly bound to each other to form a wall of the SFG pores. In fact, the SFG structure is found in many free-standing RGO platelets (FIG. 5E). This is one of evidences supporting the above-described mechanism for forming an SFG structure.

The RGO platelets are composed of 5 to 10 graphene layers, and the distance between the layers is 3.52 Å, as analyzed by HRTEM (FIG. 5F). This is further verified by the X-ray diffraction radiation (XDR) and Scherer's equation. The average thickness of the SFG structure is approximately 9.3 μm, and the thickness of BGL is approximately 100 nm (FIG. 6A).

The role of BGL present below the SFG structure is very important. 2-D BGL serves as an electron reservoir that especially effectively induces the transfer of charges from the 3-D SFG structure on a non-conductive substrate. FIG. 6B is a side view showing a HRSEM image of the SFG film. The size of the pores is in a range of 1 to 3 μm, which is identical to the size as viewed from a plane. The SFG structure according to one embodiment of the present invention has a conductivity of 6.7 10 Scm$^{-1}$ which is lower than that of the foam-shaped graphene having a conductivity of 10 Scm$^{-1}$, which is derived by means of the CVD method. However, when the SFG film is annealed (or calcined) at 400° C. for 4 hours under argon gas, the SFG film has a conductivity of 11.8 Scm$^{-1}$ and a surface resistance of 91.2Ω, both of which are higher than those of SFG films prepared by conventional methods (Table 1).

TABLE 1

Conductivity and surface resistance of GO, SFG and SFG-A

| Sample | Resistance (Ω) | Conductivity (S/m) |
| --- | --- | --- |
| GO | >500 MΩ | — |
| SFG | 161.1 (±0.088) | 6.7 |
| SFG-A[a] | 91.2 (±0.021) | 11.8 |

[a]SFG-A: Calcined SFG film at 400° C. for 4 hours under argon

Figure 7:
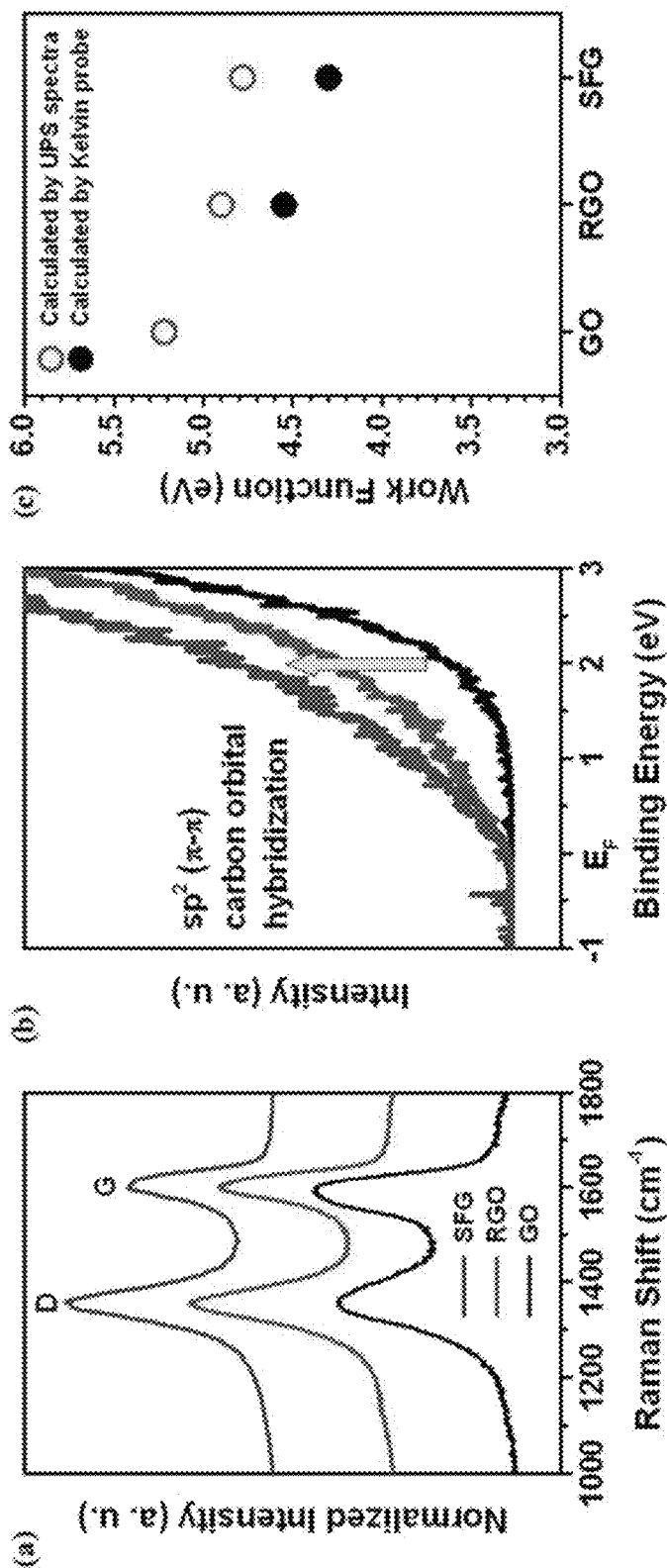
FIG. 7 shows the characteristics of the SFG structure, that is, Raman spectra, UPS spectra, and work functions of GO, RGO and SFG.

The conductivity of the chemically derived SFG structure is mainly determined by the resistance of RGO itself and the resistance between the RGO platelets. As described above, the RGO platelets are self-assembled by means of condensation of hydrogen bonds. The interaction between the platelets is too strong to separate the SFG film using a Scotch tape and ultrasonication in water. The resistance between the RGO platelet may be minimized due to the intimate distance and strong adhesion between the RGO platelets. In addition, the nuclear boiling further reduces the RGO platelets themselves due to a thermal reduction as described above. As shown in FIG. 3B, the (C—C and C═C)/(C—O+C═O+C(O)O) ratio of GO (1.1) increases to 1.8 (RGO) and 2.1 (SFG) due to recovery of a sp$^2$ domain. These results show that the ratio of GO is further reduced during the nuclear boiling. The XPS results are proven by Raman spectroscopy. In a Raman study, the $I_D/I_G$ ratio of GO (0.88) increases to 1.16 (RGO) and 1.43 (SFG) (FIG. 7 and Table 2).

TABLE 2

Raman parameters of GO, RGO and SFG

| | Raman parameters | | |
| --- | --- | --- | --- |
| Sample | $I_D$ | $I_G$ | $I_D/I_G$ |
| GO | 0.88 | 1 | 0.88 |
| RGO | 1 | 0.86 | 1.16 |
| SFG | 1 | 0.70 | 1.43 |

A G band (at 1,600 cm$^{-1}$) and a D band (at 1,354 cm$^{-1}$) occur from an aromatic carbon ring such as ripples, edges and defects, and an E2g mode of disorders, respectively. According to direct exfoliation of pure graphene or graphite prepared by a 'Scotch tape method,' the G band has a stronger strength than the D band. In most of research on RGO, however, two bands appear to have a similar strength, which indicates that a level of disorders increases during the thermal reduction in spite of the recovery of 6-tiems aromatic rings. After the nuclear boiling, the level of disorders further increases due to the additional thermal reduction.

The ultraviolet photoemission spectroscopic (UPS) spectra of the GO, RGO, and SFG films are measured to further study a binding state and a degree of thermal reduction. In a balance band structure, the strength of peaks around Fermi energy ($E_{Ferimi}$) reflects metallic characteristics of respective substances (FIG. 7B). When GO is reduced into RGO, the peak strength further increase due to sp$^2$ binding recovery. Also, the peak strength of SFG is much higher than that of the nuclear boiling RGO. $E_{cutoff}$ and $E_{Ferimi}$ are clearly defined, and the work function of each film is calculated using the following Equation 1.

$$\phi = h\nu - E_{cutoff} + E_{Fermi} \quad \text{Equation 1}$$

wherein hν (40.8 eV) represents photon energy received from a He II source, and a bias of −5 V applied to form the boundary in an $E_{cutoff}$ region. In the case of the GO film, however, $E_{cutoff}$ may be measured due to charging on a surface of the GO film. The work function of a conductive film depends mainly on surface properties and volume properties. The surface properties including the work function is known to depend mainly on the nature of a sample. The work function of graphene is in a range of 4.2 eV to 4.5 eV. The real work function of RGO is 4.55 eV (4.90 eV as measured by Kelvin's calculation), and the real work function of SFG is 4.30 eV (4.78 eV), indicating that SFG is more reduced than RGO. The work functions of OH, —O—, and COOH groups on RGO decrease. It is concluded that RGO is further reduced during the nuclear boiling due to a decrease in the work function, an increase in (C—C or C=C)/(C—O+C=O+C(O)O) ratio, and an increase in $I_D/I_G$ ratio. The conductivity of SFG is chemically reduced due to a combination of a good binding property and the recovery of sp2 bonds.

BGLs and SFGs explain how the structure is formed on a surface of a heater. First, it is possible to observe which phenomenon occurs between the heater and the RGO colloid solution under control of the heat flux. The heat flux gradually rises to preserve a stable state (FIG. 8A). Graphene is not found on a top surface of the heater even as the time increase at a heat flux of 50 kW/m² (in the case of a nuclear boiling point of approximately 112° C.), indicating that it is essential to form bubbles so as to form the RGO structure on the heater. When the heat flux increases to 100 kW/m², the bubbles start to be formed (when the nuclear boiling point slightly increases to approximately 115° C.) (FIG. 8B).

While the repeated formation and growth of the bubbles are achieved, a liquid film having a fine thickness (i.e., a microlayer) formed on a bottom surface of a bubble layer has graphene horizontally aligned thereon. As the size of the bubbles increases, a triple line (a line on which gas, liquid and solid phases converge) moves to form BGLs along a microlayer of the bubbles. Much more bubbles are generated at a heat flux of 400 kW/m², and lumping of many bubbles occurs. Several tens of separate bubbles are suddenly combined as the bubbles grow and break away. Since the concentration of the RGO platelets suddenly increases in void spaces between the bubbles, the RGO platelets are compressed during a process of forming a seed for such SGF structures (FIGS. 8B and 1B).

FIGS. 8B to 8E show only the places in which the bubbles are generated. Here, a seed for BGLs and SFG is placed on a surface of a substrate. Many small bubbles covers the whole of the heater at a high heat flux region (800 to 1,200 kW/m²). In this case, the bubbles are combined to be generated. Therefore, SFG structures having relatively small and uniform pores are produced (FIGS. 8D and 8E). The pore size of the SFG structures may be adjusted by controlling the heat flux. However, a large amount of time is required in an hour unit to produce the SFG structures at a low heat flux (800 kW/m² or less). Also, it is difficult to obtain the uniform pores (FIG. 8D). Cracking of the heater makes it difficult to increase the heat flux to 1200 kW/m² or more. However, when a system is properly controlled, the SFG structures may be formed much more small and uniformly (in a second or minute unit). When the nuclear boiling time is changed to 10 minutes and 60 minutes, SFG films having a thickness of 9.3 μm and 42.2 μm are obtained.

Based on the above-described above mechanism, the SFG structure may be placed on a substrate such as TCO (FTO), a metal (copper), a glass, or a polymer (PDMS) using additional processes, such as etching using a SFG transfer process, and polymer removal, without any surfactant. The SFG structure is easily formed on the conductive substrate such as FTO and copper (FIGS. 9A and 9B).

Figure 9:
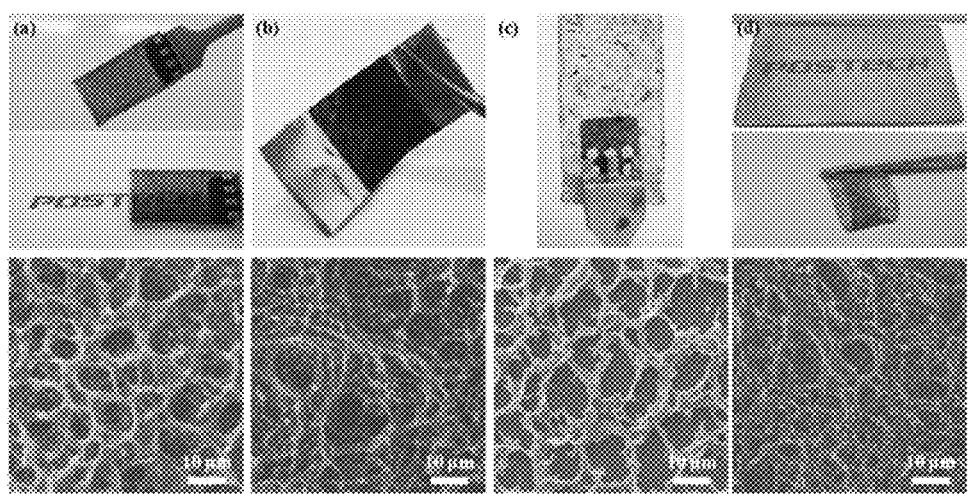
FIG. 9 shows the shapes of the SFG structures formed on various substrates.
Figure 10:
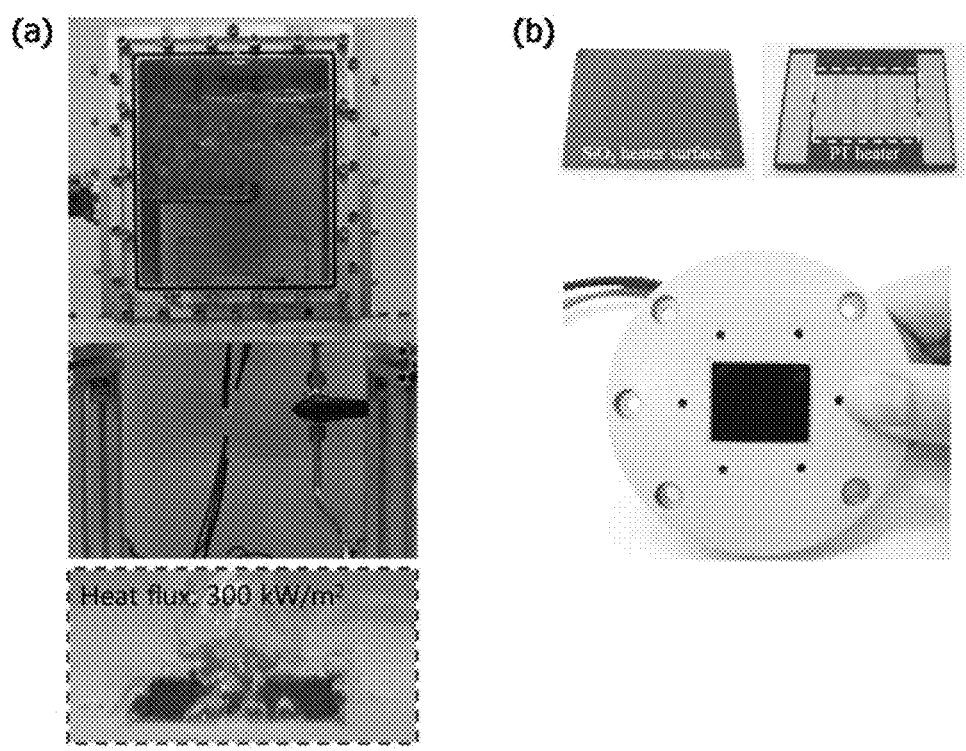
FIG. 10 shows a nuclear boiling experimental device.

It is possible to produce the SFG structure even on a non-conductive substrate such as a glass or PDMS when the substrate comes in contact with the heater (FIGS. 9C and 9D). The SFG structures on each substrate are determined by means of SEM analysis. In all cases, the scaling-up is easy. The size of the SFG structure coated with PDMS is greater than or equal to 6 cm (FIGS. 9D and 10). The three films except copper (the metals are opaque) exhibit semi-transparency even when the films have an extremely thin thickness (approximately 10 μm). The pores in the SFG film are made semi-transparent.

Among these, the present inventors apply the SFG structure loaded onto FTO so as to resist against electrodes of quantum dot-sensitized solar cells (QDSSCs). The QDSSCs has the same configuration as dye-sensitized solar cells (DSSCs), but use inorganic quantum dots (QDs) as a light absorbent instead of a molecular dye. The use of the inorganic QDs has several advantages such as generation of multiple exiton generation band gaps by adjusting the configuration and size of QDs, a high molar extinction coefficient, a high dipole moment, etc. However, the maximum current conversion efficiency (η) of QDSSCs is approximately 4%, which is much lower than the maximum current conversion efficiency (η) of the DSSCs. In this system, CdS and CdSe use visible light to absorb QDs, and a ZnO nanowire serves as an electron collector such as an absorber layer (FIG. 11A).

Electrons generated by radiation of CdSe (1.7 eV) and CdS (2.4 eV) move to ZnO conductive region. Then, holes move in an opposite direction to oxidize a polysulfide (FIG. 11A). A rare and expensive Pt or Au catalyst is used as the counter electrode. In current research, a FTO noble-metal-free counter electrode is applied to manufacture high-efficiency CdSe/CdS/ZnO nanowire-based QDSSCs. A well connected SFG frameworks having many pores provide a very high area, excellent wettability, and charge transfer in electrolytes.

Figure 11:
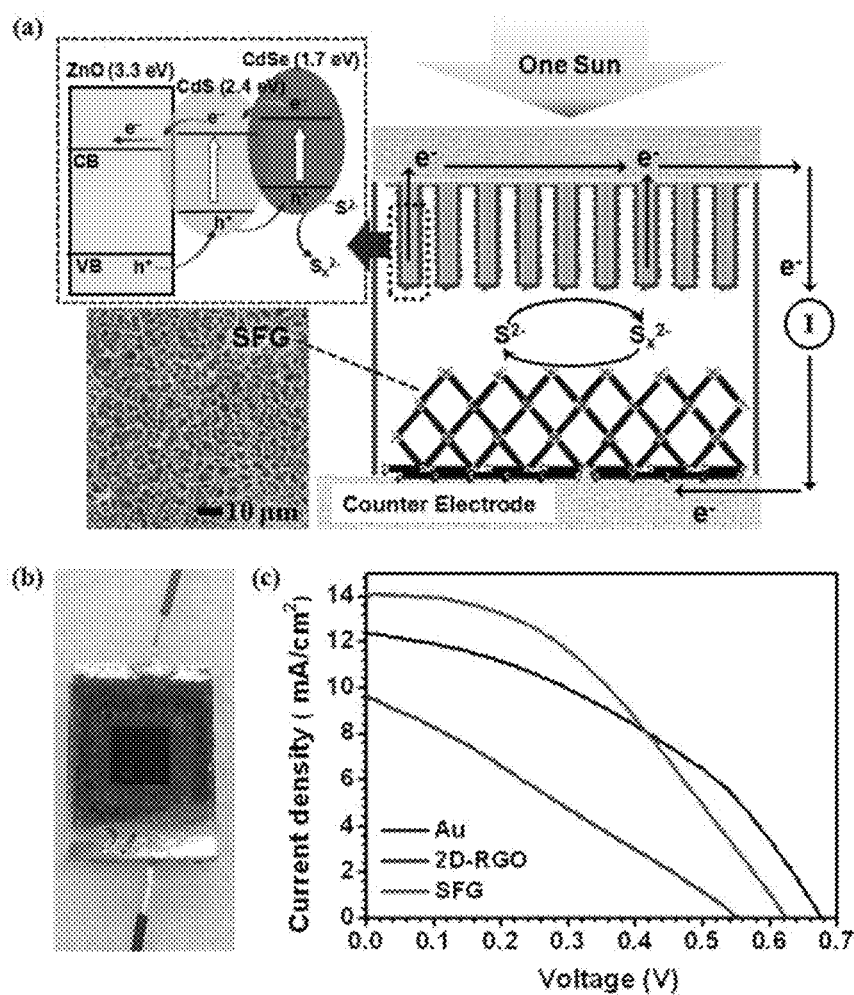
FIG. 11 shows SFG-based quantum dot sensitized solar cells (QDSSCs)

FIG. 11B shows a real image of SFG-based QDSSCs. A red dotted box represents a real active region including a CdSe/CdSe/Zn nanowire system (0.25 cm²). For comparison, Au- and 2-D RGO-based QDSSCs are also shown. Pt is not contemplated due to the lack in activity caused by a chemical absorption action of sulfur compounds.

The basic J-V characteristics of CdSe/CdS-cosensitized ZnO nanowire solar cells are to use Au, 2-D RGO, and SFG, and use a solar-intensity polysulfide electrolyte with air mass 1.5 global (AM 1.5G). Detailed photovoltaic parameters of respective samples, that is, an open circuit voltage (Voc), a short circuit current density (Jsc), a fill factor (FF), and η are listed in Table 3.

TABLE 3

Photovoltaic properties of QDSSCs with different counter electrodes (Au, SFG, and 2-D RGO)

| Sample | $V_{oc}$ (mV) | $J_{sc}$ (mA/cm²) | FF | η (%) |
|---|---|---|---|---|
| Au | 675 | 12.4 | 0.40 | 3.6 |
| SFG | 624 | 14.1 | 0.40 | 3.6 |
| 2-D RGO | 555 | 9.6 | 0.27 | 1.4 |

The SFG cells have the highest η of 3.60%, including a $V_{oc}$ of 624 mV, a $J_{sc}$ of 14.1 mA/cm², and a FF of 0.42, to shield light from other regions. The η of the SFG cells is highest compared to Au (3.4%) and 2-D RGO (1.4%) (FIG. 9B and Table 3).

The electrolytes may penetrate through the pores of the SFG structure due to the wettability of the SFG structure. Thus, a large surface of the SFG structure may be used as a whole. Also, a good binding property between the RGO platelets may help the transfer of electrons through the polysulfide electrolytes. However, only an exposed surface of the 2-D RGOs may be used. In addition, the conductivity of SFG is higher than that of RGO, as described above. As a result, the parameters η, $J_{sc}$ and FF of the SFG cells are much higher than those of 2-RGO, and has slightly better cell performance than reference cells (Au). The efficiency of the SFG film may be further improved by adjusting the pore size and thickness of the SFG film. In the case of the bubbles such as graphene grown by the CVD method, the hydrophobicity may prevent the accession of electrolytes, as described above.

As described above, 3-D SFGs may be easily bubbled on any substrate such as TCO, various metals, a glass, and a polymer by nuclear boiling without any additional process. SFGs are formed by self-assembly between the respective RGO platelet due to the bubbles. Also, the XPS, Raman, and UPS analyses show that RGO may be reduced by nuclear boiling. The (C—C or C=C)/(C—O+C=O+C(O)O) ratio and $I_D/I_G$ ratio of SFG increase, and the work function of SFG decreases, compared to RGO. The film has a surface resistance of 91.2Ω and a conductivity of 11.8 S/cm, which are similar to those of graphene obtained by the CVD method. An SFG cathode resembles an Au counter electrode in the QDSSCs due to a wide area, a good binding property, and easy diffusion, and has an activity of an electrical catalytic action of a polysulfide redox couple superior to the 2-D RGO cells. The SFG counter electrode exhibits the highest photovoltaic performance. That is, SFG counter electrode has the highest η, Voc, Jsc and FF of 3.60%, 624 mV, 14.1 mA/cm$^2$ and 0.41, respectively. The nuclear boiling is a simple and inexpensive method that may be used to produce and easily grow the SFG structure. The SFG structures formed on various substrates may be applied in various fields such as super capacitors, chemical biological sensors, energy storage devices such as high-performance scaffolds of DSSCs or photoelectrochemical cells (PECs), etc.

EXAMPLES

Preparation of SFG Structures

Figure 8:
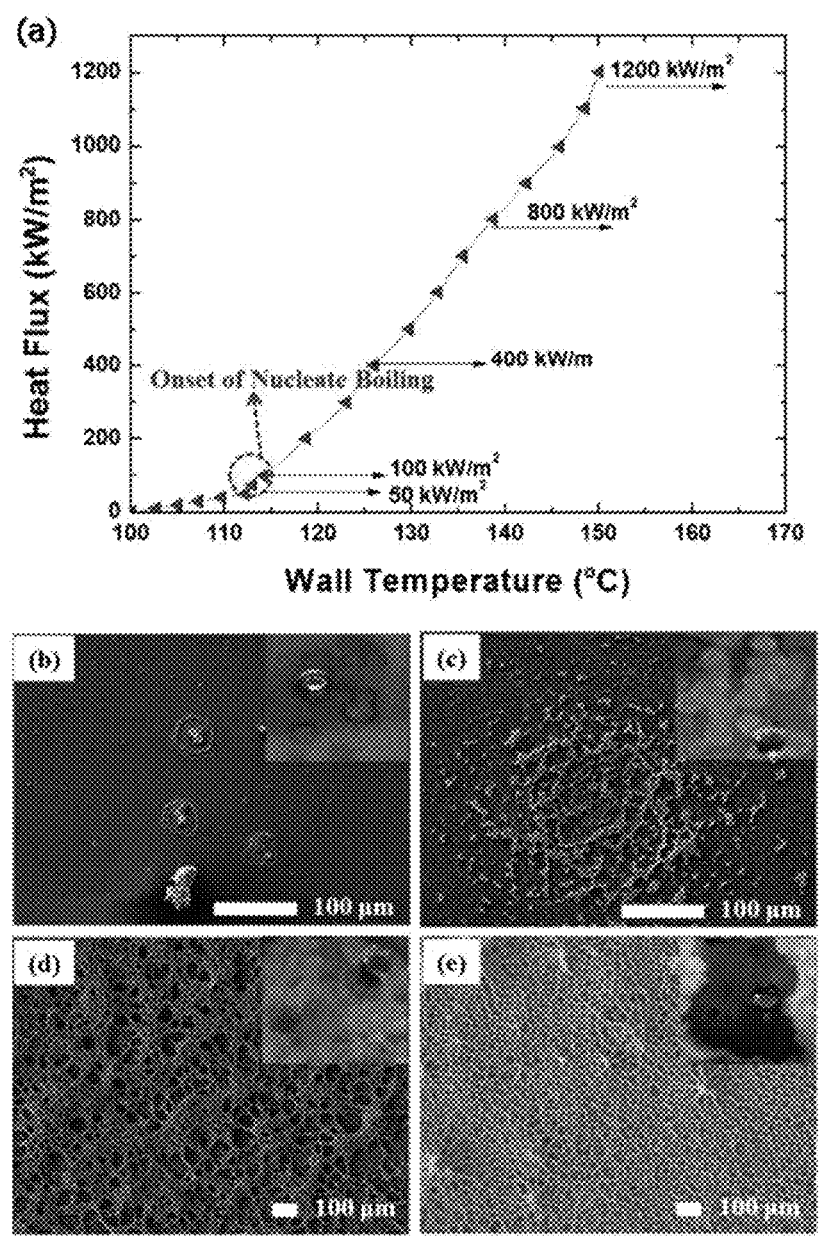
FIG. 8 is a diagram showing the results of a nuclear boiling experiment.

The nuclear boiling was performed using laboratory equipment equipped with a pull chamber containing saturated water, a reflux condenser, a 400 W preheating device, and a heater substrate formed on a bottom surface thereof. Since gases dissolved in a RGO colloid solution should be removed, the RGO colloid solution was satisfactorily saturated for 2 hour before the heat flux of the heater substrate was adjusted using the preheating device. The silicone substrate having a size of 20×25 mm includes an $SiO_2$ layer, which serves as a heater. An exothermic body was a thin platinum film that had a thickness of approximately 1,200 μm. A layer was formed on a bottom surface of the film using an E-beam evaporator. The platinum film was patterned on the bottom surface of the heater, and $SiO_2$ coating is required to measure an exact wall temperature (i.e., a temperature of the substrate), and essential to measure the heat flux for a mechanism for forming an SFG structure (FIG. 8).

Before a boiling experiment (SFG coating), the patterned platinum film on the bottom surface of the silicone heater was scaled with a pattern using a four-wired method according to a temperature of 100, 120, 140 and 160° C. so as to measure the resistance of the platinum film in a convection oven (JEIO TECH, OF-12GW). Thus, a linear ($R^2$: approximately 0.99999) scaling chart between the temperature and the resistance was used to estimate a wall temperature of the silicone heater during a boiling experiment. As shown in FIG. 10A, the nuclear boiling of the heater substrate was caused at a heat flux of 300 kW/m$^2$ as indicated in a red dotted box. The RGO colloid solution was prepared at a concentration of 0.0005 wt % together, and was based on distilled water. After the preparation process as described above, the heat flux gradually increased to 50 kW/m$^2$ to preserve a stable state. In each process, the heat flux was adjusted for 2 minutes, and the heat flux continued to increase to 1,200 kW/m$^2$. The SFG structure was coated with copper, FTO, a glass, and PDMS without any $SiO_2$ coating and platinum film pattern. FTO having am area of 40×15 mm was prepared, and a heat flux of 600 kW/m$^2$ was applied to SFG on FTO for 2 hours by means of direct heating. Copper foil (Aldrich, 349208-33G) having an area of 10×12 mm was prepared, and the same conditions as in FTP were applied to SFG on the copper foil. An indirect heating method was applied to a non-conductive substrate such as PDMS or a glass. The SFG structures were formed on PDMS and glass physically attached to the silicone heater.

Preparation of CdSe/CdS/ZnO Nanowire Photoelectrode and Cell Fabrication

A CdSe/CD/ZnO nanowire array was prepared using a 3-step solution-based method. A ZnO NW array on a FTO substrate (TEC, 13 Ω/sq.) was dipped in solutions of 0.01 M $Zn(NO_3)_2 6H_2O$ and 0.5 M $NH_4OH$ at 95° C. for 20 hours using an ammonia solution method. A ZnO nanowire electrode was sensitized in situ with CdS and CdSe using continuous ion layer absorption, a reaction (SILAR) and chemical bath deposition (CBD). A counter electrode and an optical electrode (having an active region of 0.25 cm$^2$) were positioned between hot-melt ionomer films (Surlyn) having a thickness of 60 μm while being heated (at 130° C. for one minute). A polysulfide electrolyte was injected through holes previously formed through the counter electrode, and each hole was sealed with a small-sized Surlyn fragment and a cover glass of a microscope. Such a polysulfide was composed of 0.5 M $Na_2S$, 2 M S, and 0.2 M KCl. The optical current density/voltage characteristics of the QDSSCs were measured under an air mass 1.5 G solar spectrum.

Characterization

The morphologies of SFG samples synthesized by an alternating current (AC) power supply device were observed under an electric-filed scanning electron microscope (SEM, XL30S, Phillips), and the detailed microscopic structure was observed under an electron microscope (Cs-corrected HR-[S]TEM, Jeol, JEM 2200FS, 200 kV) at the National Center for Nanomaterial Technology (NCNT) of the POSTECH. The contact angle was measured using two phase flow laboratory high-resolution digital cameras and a cold spot light system from the POSTECH. The absorption of droplets into the SFG structure was observed in an electron microscope (ESEM) mode of SEM (FEI, Quanta 200) at the UNIST. The detailed morphologies and height information were studied using AFM (Nanoscope IIIa, Digital Instrument Inc.), and the Raman spectra were obtained using a Raman spectrometer (Alpha 300R, WITEC) equipped with a diode laser with a wavelength of 532 nm. The AFM and Raman studies were performed at the Nanomaterial Research Laboratory (NRL) of the POSTECH. The binding state and work function of each film were examined by means of XPS and UPS measurements. The resistance of each film was measured using a four-point probe method (KEITHLEY 2000).

The present invention has been described in detail. However, it should be understood that the detailed description and specific examples, while indicating preferred embodiments of the invention, are given by way of illustration only, since various changes and modifications within the scope of the invention will become apparent to those skilled in the art from this detailed description. Therefore, the preferred embodiments disclosed herein are intended to describe the present invention, but not intended to limit the scope of the present invention, and the scope of the present invention is not limited by the preferred embodiments. Thus, the scope of the present invention should be interpreted by the appended claims and their equivalents, and also it should be interpreted that the present invention covers all such modifications provided they come within the scope of the appended claims and their equivalents.

The invention claimed is:

1. A method for producing a foam-shaped graphene structure by boiling, comprising the steps of:

preparing a base substrate (S1);

placing the base substrate in a reduced graphene oxide (RGO) colloid solution (S2);

applying a heat flux to the base substrate using an exothermic body so as to cause boiling (S3); and generating a foam-shaped graphene structure on the base substrate as bubbles generated by the boiling overlap (S4).

2. The method of claim 1, wherein the base substrate in Step S1 is at least one selected from the group consisting of silicone, a transparent conductive oxide (TCO) glass, a metal, a mother glass, and an elastic polymer.

3. The method of claim 1, wherein the graphene oxide in Step S2 is reduced by hydrazine.

4. The method of claim 1, wherein the reduced graphene oxide is present at a content of 0.01 to 0.0001% wt in the colloid solution in Step S2.

5. The method of claim 1, wherein the reduced graphene oxide is present at a content of 0.005% wt in the colloid solution in Step S2.

6. the method of claim 1, wherein the base substrate itself serves as the exothermic body in step S3.

7. The method of claim 1, wherein the heat flux in Step S3 is adjusted within a range of 100 kW/m$^2$ to 1,500 kW/m$^2$.

* * * * *